US010262515B2

(12) United States Patent
Ritala et al.

(10) Patent No.: US 10,262,515 B2
(45) Date of Patent: Apr. 16, 2019

(54) TRACKING SYSTEM

(71) Applicant: Yepzon Oy, Tampere (FI)

(72) Inventors: Juha Ritala, Tampere (FI); Otto Linna, Toijala (FI); Jani Hätönen, Espoo (FI)

(73) Assignee: Yepzon Oy, Tampere (FI)

( * ) Notice: Subject to any disclaimer, the term of this patent is extended or adjusted under 35 U.S.C. 154(b) by 0 days.

(21) Appl. No.: 15/025,610

(22) PCT Filed: May 30, 2014

(86) PCT No.: PCT/FI2014/050436
§ 371 (c)(1),
(2) Date: Mar. 29, 2016

(87) PCT Pub. No.: WO2015/044505
PCT Pub. Date: Apr. 2, 2015

(65) Prior Publication Data
US 2016/0240062 A1   Aug. 18, 2016

(30) Foreign Application Priority Data
Sep. 29, 2013   (FI) .................................. 20130159 U

(51) Int. Cl.
G08B 21/02   (2006.01)
H04W 4/029   (2018.01)
H04W 4/80   (2018.01)

(52) U.S. Cl.
CPC ....... G08B 21/0269 (2013.01); G08B 21/023 (2013.01); G08B 21/028 (2013.01);
(Continued)

(58) Field of Classification Search
CPC ....... H04W 4/02; H04W 64/00; H04W 4/008; H04W 4/028; G01S 19/34; G01S 5/0027;
(Continued)

(56) References Cited

U.S. PATENT DOCUMENTS 8,576,077 B2   11/2013 Pitchers
2003/0214411 A1   11/2003 Walter et al.
(Continued)

FOREIGN PATENT DOCUMENTS

WO   2006085821 A1   8/2006
WO   2009109736 A2   9/2009

OTHER PUBLICATIONS

Office action of the corresponding CN application 2014800603115 dated Nov. 23, 2017.

Primary Examiner — Quoc Thai N Vu
(74) Attorney, Agent, or Firm — Berggren LLP

(57) ABSTRACT

A tracking unit comprising: positioning means for determining a location of the tracking unit; a transceiver unit for communicating at least position data of the tracking unit; a power supplying circuitry for supplying power to the tracking unit; the tracking unit being configured to switch from a first power saving state to an active state after a first predetermined period; send a request to a network address of a positioning application for checking if a location update request has been given to the tracking unit; in response to the location update request being given, determine the location of the tracking unit and send the position data of the tracking unit to the network address; and in response to the location update request not being given or the position data of the tracking unit being sent to the network address, switch back to the first power saving state.

8 Claims, 2 Drawing Sheets

Figure 1:
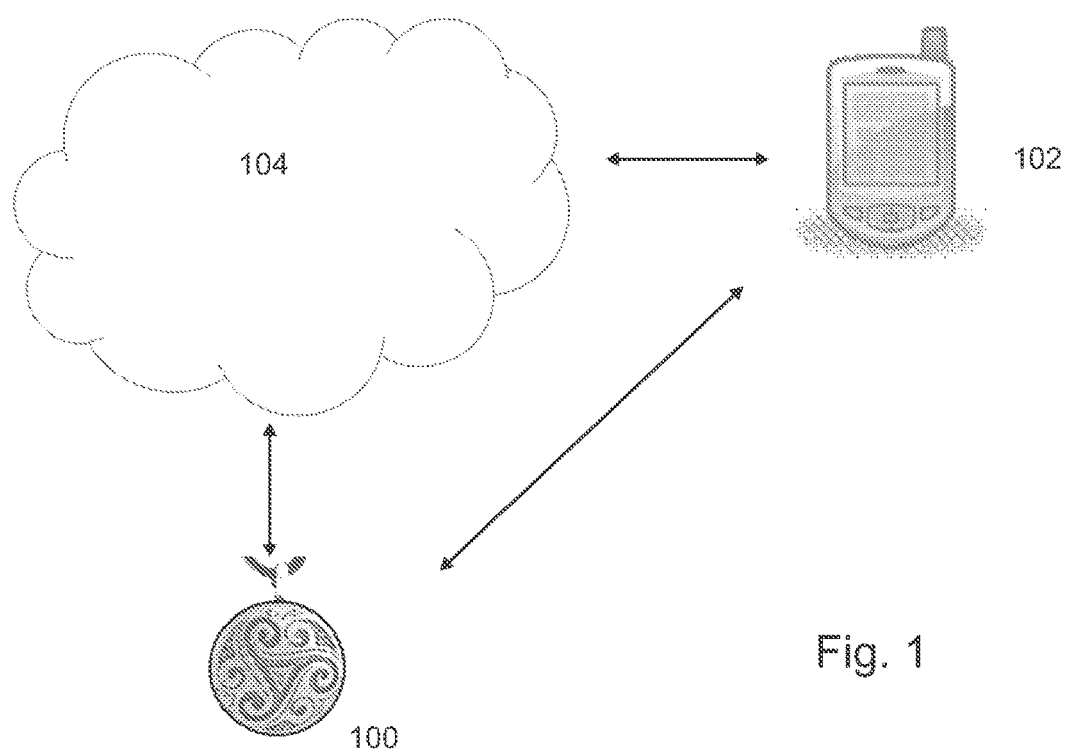

(52) U.S. Cl.
CPC ..... *G08B 21/0238* (2013.01); *G08B 21/0272* (2013.01); *H04W 4/029* (2018.02); *H04W 4/80* (2018.02); *Y02D 70/144* (2018.01); *Y02D 70/164* (2018.01); *Y02D 70/166* (2018.01)

(58) Field of Classification Search
CPC ........ G01S 19/05; G01S 5/0018; G01S 19/42; G01S 19/51; G06F 1/3212; G06F 1/325; G06F 1/3287; G08B 21/023; G08B 21/0238; G08B 21/0269; G08B 21/0272; G08B 21/028; G08B 21/00; G08G 1/20; Y02B 60/50; Y02D 70/164; Y02D 70/166; Y02D 70/144

See application file for complete search history.

(56) References Cited

U.S. PATENT DOCUMENTS

| | | |
|---|---|---|
| 2005/0032504 A1 | 2/2005 | Camp |
| 2007/0021100 A1* | 1/2007 | Haave .................. B60R 25/102 455/404.2 |
| 2007/0241888 A1 | 10/2007 | Mantovani et al. |
| 2010/0069087 A1 | 3/2010 | Chow et al. |
| 2013/0048720 A1 | 2/2013 | Lewis |
| 2013/0237204 A1* | 9/2013 | Buck ................. H04M 1/72569 455/418 |
| 2014/0073242 A1* | 3/2014 | Chen ................... H04B 5/0056 455/41.1 |
| 2014/0113550 A1* | 4/2014 | Li .......................... H04L 67/06 455/41.1 |
| 2014/0160085 A1* | 6/2014 | Rabii .................... G06F 1/3262 345/178 |
| 2014/0218238 A1* | 8/2014 | Cooke .................. H04W 4/028 342/385 |

\* cited by examiner

TRACKING SYSTEM

FIELD OF THE INVENTION

The present invention relates to utilization of positioning information, and more particularly to a tracking system.

BACKGROUND OF THE INVENTION

Along with the development of positioning technology, there has been remarkable increase in demand for various tracking applications. One type of tracking applications relates to safety of a human; for example, parents may want track the whereabouts of their children. For that purpose, a mobile phone carried along by a child may be provided with a tracking application, which updates the position information of the mobile phone as the child moves around, and sends the position information to an application used by the parents, which enables the parents to monitor the motion of the child practically in real time.

It may also be desirable to track animals, such as pets, to ensure that they do not get lost or otherwise harmed. For instance, hunting dogs are often equipped with tracking devices in case the dogs become lost during hunting or training.

However, if the wearer of the tracking device, such as a child or a pet, becomes lost for some reason, the conventional tracking devices do not provide the tracking signal very long. For example, the power consumption of known animal tracking devices that utilize the Global Positioning System (GPS) will discharge the battery only in few days.

The same applies to mobile phone applications. Moreover, to ensure as long trackability as possible, it is required to charge the battery of a known tracking device (or mobile phone) frequently, thus causing the usage to become cumbersome.

SUMMARY OF THE INVENTION

Now there has been invented an improved tracking system, by which the above problems may be alleviated. Various aspects of the invention include a tracking unit and computer programs, which are characterized by what is stated in the independent claims. Various embodiments of the invention are disclosed in the dependent claims.

A tracking unit according to a first aspect comprises: positioning means for determining a location of the tracking unit; a transceiver unit for communicating at least position data of the tracking unit; a power supplying circuitry for supplying power to the tracking unit; the tracking unit being configured to switch from a first power saving state to an active state after a first predetermined period; send a request to a network address of a positioning application for checking if a location update request has been given to the tracking unit; in response to the location update request being given, determine the location of the tracking unit and send the position data of the tracking unit to the network address; and in response to the location update request not being given or the position data of the tracking unit being sent to the network address, switch back to the first power saving state.

According to an embodiment, the tracking unit is configured to be paired with a host apparatus, the host apparatus being entitled, in response to said pairing, to send location update requests of the tracking unit to said network address.

According to an embodiment, said pairing comprises waking up the tracking unit from a power-off state; carrying out a wireless pairing between the tracking unit and the host apparatus; and registering the tracking unit at said positioning application, said registering comprising transmitting a unique identification of the tracking unit to said positioning application.

According to an embodiment, said tracking unit is configured to be waked up from the power-off state by activating a near-field-communication (NFC) tag included in the tracking unit.

According to an embodiment, said tracking unit is configured to be paired with the host apparatus by a NFC pairing or Bluetooth pairing.

According to an embodiment, the tracking unit comprises an acceleration sensor; the tracking unit being configured to monitor output signals of said acceleration sensor; and in response to said output signals of said acceleration sensor indicating that the tracking unit has been substantially stationary for a second predetermined period, switching the tracking unit to a second power saving state, wherein the second predetermined period is substantially longer than the first predetermined period and the tracking unit consumes less power in the second power saving state than in the first power saving state.

According to an embodiment, the tracking unit comprises a battery and the tracking unit is configured to monitor a charging level of the battery; and in response to the charging level dropping below a predetermined threshold value, the tracking unit is configured to send an indication to the positioning application and/or to the host apparatus.

According to an embodiment, in response to a user input, the tracking unit is configured to send location update signals continuously at repeated intervals.

According to an embodiment, the tracking unit is configured to adjust any of the first predetermined period, the second predetermined period and the repeated intervals of sending alarm signal according commands received from the host apparatus.

According to an embodiment, the tracking unit is arranged to determine the position data of the tracking unit on a plurality levels of accuracy, said levels comprising one or more of the following:
cell identity of the cell of a cellular network, in which the tracking unit is residing;
location approximation based on Observed Time Difference (OTD) from a plurality of base stations of a cellular network;
satellite positioning accuracy;
proximity location approximation based on Bluetooth LE-signal.

A second aspect relates to a computer program product, stored on a computer readable medium and executable in a data processing device, for processing tracking data, the computer program product comprising: a computer program code section for registering a pairing of a tracking unit and at least one host apparatus; a computer program code section for maintaining a location update request of the tracking unit received from said host apparatus; a computer program code section for providing, in response to a checking request from said tracking unit, said location update request to said tracking unit; and a computer program code section for providing, in response to receiving position data of tracking unit, the position data of tracking unit to said host apparatus.

A third aspect relates to a computer program product, stored on a computer readable medium and executable in a data processing device, for using a tracking service, the computer program product comprising: a computer program code section for registering, after installing the computer program product in an apparatus, a pairing of said apparatus and a tracking unit to a positioning application; a computer program code section for sending a location update request of the tracking unit to the positioning application; and a computer program code section for receiving position data of tracking unit from the positioning application.

These and other aspects of the invention and the embodiments related thereto will become apparent in view of the detailed disclosure of the embodiments further below.

LIST OF DRAWINGS

Figure 2:
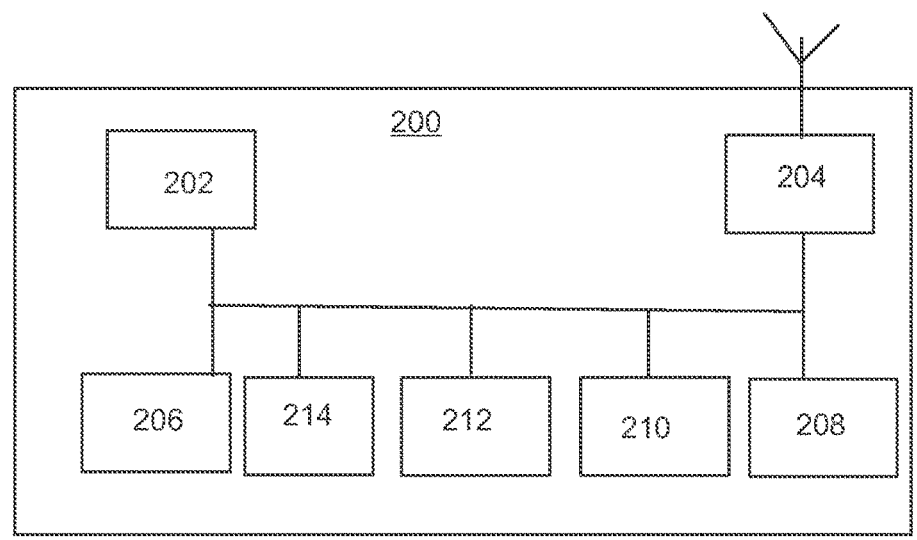
Figure 3:
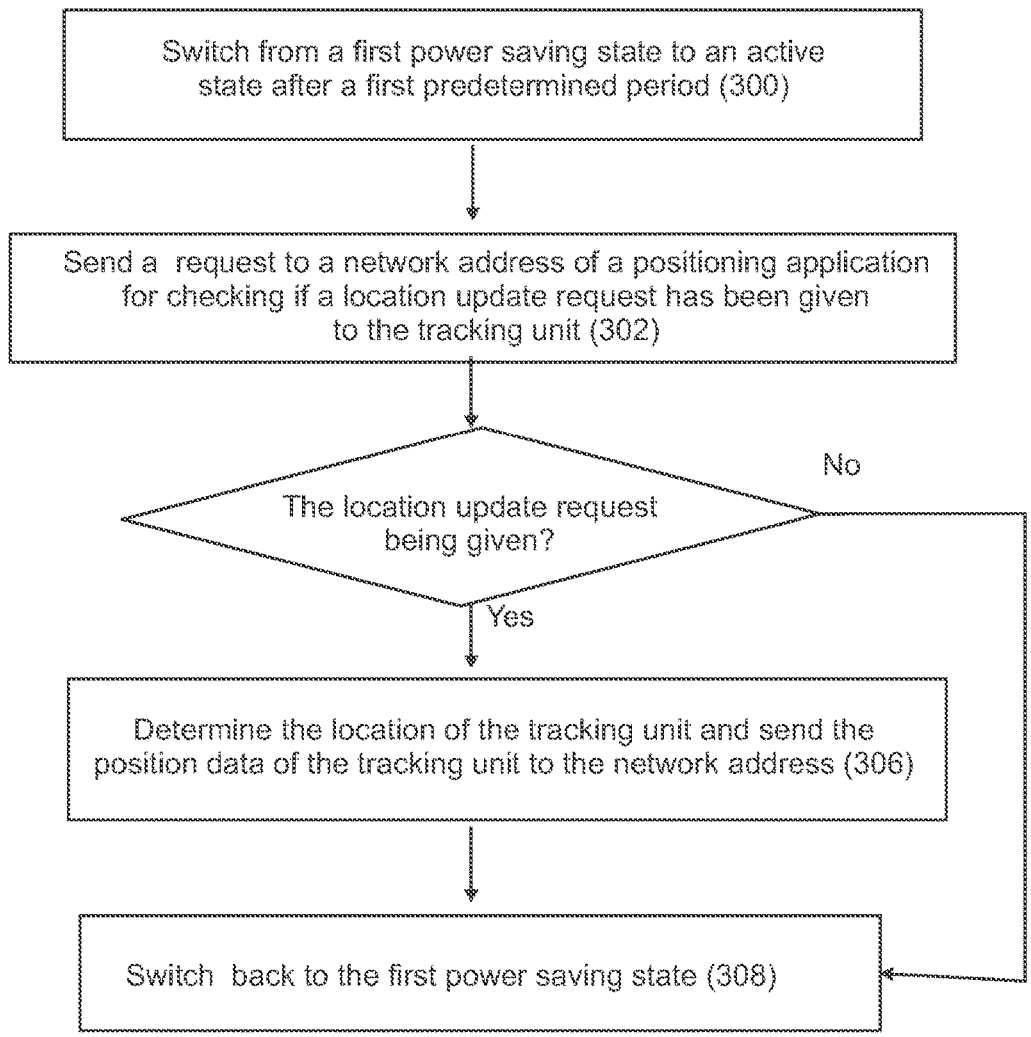

In the following, various embodiments of the invention will be described in more detail with reference to the appended drawings, in which FIG. 1 shows a schematic view of a system for carrying out the tracking service according to various embodiments;

FIG. 2 shows a block chart of functional units of a tracking unit according to an embodiment; and FIG. 3 shows a method for controlling the tracking unit according to an embodiment in a flow chart.

DESCRIPTION OF EMBODIMENTS

FIG. 1 illustrates a schematic view of a system capable of providing various tracking-related embodiments described herein below. The tracking system of FIG. 1 comprises a tracking unit 100, a host apparatus 102 and a positioning application 104 for managing tracking services between tracking unit-host apparatus-pairs.

The tracking unit 100 may preferably be small-sized and lightweight, preferably less than 100 grams. The tracking unit is intended to be carried by a person, such as a child or an Alzheimer patient, such that the location of the person can be verified, if necessary. The tracking unit may be a stand-alone device, which may be carried along e.g. in a pocket or in a neckband, or the tracking unit may be integrated to a garment e.g. by sowing. The tracking unit may also be carried by a pet, for example in collar of a dog or a cat. The tracking unit may preferably be waterproof, dustproof and drop-proof.

The tracking unit may also be connected to an object, such as a bicycle. The tracking unit may also be integrated to an apparatus, such as a mobile phone, a smart phone, an Internet access device (Internet tablet), a personal computer of various size and format. Therein, the functionalities of the tracking unit may be implemented using at least partly the same components as used in the apparatus.

The positioning application 104 is the server application providing the tracking service. The positioning application 104 may be implemented as Software-as-a-Service (SaaS)-based service, meaning that the application software is executed and controlled in one or more servers residing in a network (a.k.a. a cloud) and the host apparatuses 102 using the application are only provided with a user interface for accessing the service; in other words, the application software is not distributed physically.

The host apparatuses 102 are preferably internet-enabled devices, thereby enabling to access the tracking service over the internet by using a downloadable dedicated host application. It may also be possible to use the tracking service via a web browser. The host apparatus 102 may be, for example, a mobile phone, a smart phone, an Internet access device (Internet tablet), a personal computer of various size and format, a television set, a set-top box, a game console or any other internet-enabled device.

A first aspect relates to the operation and functionalities of the tracking unit. According to an embodiment disclosed in FIG. 2, the tracking unit (200) comprises at least positioning means (202) for determining a location of the tracking unit; a transceiver unit (204) for communicating at least position data of the tracking unit; and a power supplying circuitry (206) for supplying power to the tracking unit. In practice, the power supplying circuitry may comprise a battery and necessary circuitry for conducting current to various units/components of the tracking unit. Alternatively, an external power unit, such as a battery of a phone, a computer or a vehicle, may be used, wherein only the necessary circuitry is needed in the tracking unit.

As shown in FIG. 3, the tracking unit is configured to switch from a first power saving state to an active state after a first predetermined period (300); send a request to a network address of a positioning application for checking if a location update request has been given to the tracking unit (302); in response to the location update request being given, determine the location of the tracking unit and send the position data of the tracking unit to the network address (304); and in response to the location update request not being given or the position data of the tracking unit being sent to the network address, switch back to the first power saving state (306).

Thus, when the tracking unit is in use, for example carried by a person or a pet or connected to a moving object, the tracking unit remains in the first power saving state most of the time, thus keeping the power consumption at a minimal level. Only at predetermined intervals, the tracking unit is configured to switch to the active state for checking if a location update request has been given to the tracking unit. Thanks to the positioning application in the network managing the location update requests, the tracking unit does not have to update its position data continuously nor transmit the position data continuously.

The predetermined interval may be adjusted such that significant savings in power consumption are achieved without endangering the safety and trackability aspects of tracking system. It should be noted that a longer interval also contributes to safety of the tracking system in terms of longer duration of sufficient battery charging level, thereby enabling a longer time for trackability of the tracking unit without charging the battery. Said first predetermined period, i.e. the interval, may be adjusted to be, for example 3-15 minutes, for example 5 minutes by default. Any other values may naturally be used, if considered appropriate.

According to an embodiment, the tracking unit is configured to be paired with a host apparatus, the host apparatus being entitled, in response to said pairing, to send location update requests of the tracking unit to said network address.

For safety reasons, the location of the tracking unit may only be requested by an apparatus, for which access rights to the tracking system have been given. Such a host apparatus may only send location update requests to such tracking unit(s) it has been paired with. On the other hand, a particular tracking unit may be paired with a plurality of host apparatuses. Thereby, for example both parents may locate any of their children.

According to an embodiment, said pairing comprises waking up the tracking unit from a power-off state; carrying out a wireless pairing between the tracking unit and the host apparatus; transmitting said network address of the positioning application to the host apparatus; and registering the tracking unit at said positioning application, said registering comprising transmitting a unique identification of the tracking unit and information about said wireless pairing to said positioning application.

In addition to the active state and the first power saving state, the tracking unit may have a power-off state. The tracking unit remains in the power-off state typically at least from the manufacturing line until taken into use for the first time. In the power-off state, the power consumption of the tracking unit results only due to internal leakage currents, being about an order of some microamperes at most. Thus, if the battery of the tracking unit has been fully charged in the manufacturing line, it is very likely that the tracking unit is ready to be taken into use immediately after buying it. When the tracking unit is taken into use and paired for the first time, the tracking unit must be waked up to the active state.

According to an embodiment, the tracking unit is configured to be waked up from the power-off state by activating a near-field-communication (NFC) tag included in the tracking unit.

For safety reasons, the tracking unit may be implemented without a power on/off switch. Thereby, any unintentional or malicious shut-off of the tracking unit can be avoided. Instead, the tracking unit may comprise an integrated NFC tag (208 in FIG. 2), for which an activation signal is provided by another NFC tag, for example comprised by the host apparatus. Alternatively, the tracking unit may be waked up by connecting it to a charger.

After waking up the tracking unit to the active state, the tracking unit and the host apparatus can be mutually paired. For example, NFC pairing can be used for registering the tracking unit and the host apparatus to each other. According to an embodiment, said tracking unit is configured to be paired with the host apparatus by a Bluetooth pairing. The tracking unit may thus comprise a Bluetooth unit (210 in FIG. 2). Hence, in addition to or instead of NFC pairing, Bluetooth pairing can be used, which is advantageous if greater amounts of data are to be transmitted between the tracking unit and the host apparatus. Bluetooth pairing can also be used in the case where the host apparatus lacks an NFC tag.

The tracking unit may have the network address of the positioning application stored e.g. in the NFC tag or in some other memory medium. After being mutually paired with the host apparatus, the tracking unit may transmit the network address of the positioning application to the host apparatus. Alternatively or additionally, the network address of the positioning application may be provided with the package or cover of the tracking unit, e.g. as printed, and the network address is then available even before the pairing. The host apparatus may then use the network address e.g. to download a host application of the tracking system, if necessary, and to complete its tasks relating to registration to the tracking service.

The tracking unit may complete its pairing process by registering the tracking unit at said positioning application, said registering comprising transmitting a unique identification of the tracking unit and the position data of the tracking unit to said positioning application.

The transceiver unit 204 of the tracking unit may comprise e.g. a 2G/3G/4G mobile network transceiver module. Such a module can be identified by its unique IMEI (International Mobile Equipment Identity) code. Moreover, such a module comprises a (U)SIM card, which can be identified by its unique IMSI (International Mobile Subscriber Identity) code. Thus, the tracking unit may be uniquely identified by its IMEI and/or IMSI code.

The positioning means 202 of the tracking unit may comprise a satellite positioning module, preferably compatible with a GNSS (Global Navigation Satellite System), such as a GPS (Global Positioning System) and/or GLONASS module. Thus, the position data of the tracking unit may comprise the coordinates determined by the GNSS module. The 2G/3G/4G mobile network transceiver module may be utilised in obtaining further location information from a cellular network, thereby obtaining the satellite position data more quickly and reliably (so called assisted GPS). In addition to or instead of the satellite positioning data, various positioning data provided by the cellular network, such as E-OTD (Enhanced Observed Time Difference) or U-TDOA (Uplink-Time Difference of Arrival), can be used.

Meanwhile, the host apparatus may complete its registration to the tracking service. After having downloaded and installed the host application, the host apparatus reads the NFC tag again and/or carries out the Bluetooth pairing. The host apparatus sends a request to the positioning application for creating a link between the host apparatus and the tracking unit, the request comprising a unique identification of the host apparatus (e.g. its IMEI and/or IMSI code) and information about said wireless pairing, e.g. Bluetooth identities of the tracking unit and the host apparatus. The positioning application identifies both the tracking unit and the host apparatus and registers their pairing.

After the tracking unit-host apparatus-pair has been registered in the positioning application, the host apparatus may start to use the tracking service. The user of the host apparatus may request location updates of the tracking unit and adjust at least some of the settings of the tracking unit. If the host apparatus and the tracking unit are residing in a proximity to each other, the host apparatus may use the downloaded host application over a Bluetooth connection directly to the tracking unit to adjust the settings. If no Bluetooth connection is possible, the host apparatus may connect to the positioning application in the network and submit commands for adjusting the settings. The tracking unit receives the commands upon checking next time if a location update request has been given to the tracking unit.

According to an embodiment, the tracking unit is configured to adjust the first predetermined period for switching from the first power saving state to the active state according commands received from the host apparatus. Herein, the user of the host apparatus may seek for a suitable trade-off between power consumption and safety aspects. For example, if the tracking unit is carried by a child, the user may want to adjust said first predetermined period to be rather short, e.g. 3-5 minutes, for safety reasons. On the other hand, if the tracking unit is connected to a movable object, e.g. a bicycle, the user may want to prefer the power consumption aspect and adjust said first predetermined period to be rather long, e.g. 1 hour.

According to an embodiment, the tracking unit comprises an acceleration sensor; and the tracking unit is configured to monitor output signals of said acceleration sensor; and in response to said output signals of said acceleration sensor indicating that the tracking unit has been substantially stationary for a second predetermined period, the tracking unit switches to a second power saving state, wherein the second predetermined period is substantially longer than the first predetermined period and the tracking unit consumes less power in the second power saving state than in the first power saving state.

It is very likely that for the majority of its lifecycle the tracking unit will remain in a substantially stationary position, i.e. between consecutive switching to the active state, the position of the tracking unit has not changed. Typically at least during night time, the tracking unit may be left at a desk or in a jacket pocket. In order to reduce power consumption for such periods, the tracking unit may utilize an acceleration sensor (212 in FIG. 2) to monitor whether the tracking unit is in motion or not. If it is noticed that the tracking unit has been substantially stationary for a second predetermined period, for example for an hour, the tracking unit switches to a second power saving state. In the second power saving state, the tracking unit switches to the active state for checking if a location update request has been given to the tracking unit significantly less frequently, e.g. every 12 hours, and thereby the tracking unit consumes less power in the second power saving state than in the first power saving state.

In addition to the acceleration sensor, the tracking unit may comprise a temperature sensor (214 in FIG. 2) for sensing body heat of a human or an animal. It may give further indicia about whether the tracking unit is still in body contact with the assumed wearer of the tracking unit (a human or an animal). For example, if the tracking unit has been left in a jacket pocket in a crowded lobby rack, the acceleration sensor may detect the movements of the jacket due to hits by passing people, but the temperature sensor may detect that the tracking unit is no longer worn by the assumed wearer.

In the second power saving state, the acceleration sensor and/or the temperature sensor may continue to monitor the status of the tracking unit. The tracking unit may preferably neglect any minor movements detected by the acceleration sensor. However, if the acceleration sensor detects continuous motion and/or the temperature sensor senses temperatures substantially matching to body heat for a longer period, the tracking unit may assume to be in use again. The tracking unit the switches to the active state for checking if a location update request has been given to the tracking unit, and thereafter switches to the first power saving state.

The second predetermined period for monitoring the immobility of the tracking unit is preferably adjusted to be substantially longer (e.g. 1 to 3 hours) than the first predetermined period for safety reasons, e.g. in order to avoid a situation where the wearer of the tracking unit has taken off the tracking unit and the host apparatus would rather soon be unable to check the location of the tracking unit for the next e.g. 12 hours, which would happen if the second predetermined period were very short (e.g. 10-20 minutes).

According to an embodiment, the tracking unit is configured to monitor a charging level of the battery; and in response to the charging level dropping below a predetermined threshold value, the tracking unit is configured to send an indication to the positioning application and/or to the host apparatus.

Thus, in order to avoid the loss of trackability due to a discharged battery, the tracking unit sends a battery-low indication to the positioning application, or if the host apparatus is within a range of Bluetooth, directly to the host apparatus. The user of the host apparatus may then take the necessary actions to recharge the battery. The tracking unit preferably comprises a connector for a charger, e.g. a USB connector, which may be sealed by a waterproof cover.

According to an embodiment, in response to a user input, the tracking unit is configured to send a location update signal continuously at repeated intervals, which may be interpreted as an alarm signal. Hence, the tracking unit may comprise an alarm state and the user of the host apparatus may send a command via the positioning application to switch to the alarm state. For example, if the user of the host apparatus notices that the bicycle to which the tracking unit has been connected has been stolen, the user may send a command to switch the tracking unit to the alarm state. Upon receiving the command, the tracking unit starts to send location updates continuously or at least at short intervals, e.g. 10 seconds intervals. Then the tracking unit can be easily followed and found based on the frequently sent location updates. The tracking unit continues to be in the alarm state, until a new command is received from the host apparatus to switch to another state, a predetermined alarm state period expires or the battery runs out of change.

According to an embodiment, the tracking unit is arranged to determine the position data of the tracking unit on a plurality levels of accuracy, said levels comprising one or more of the following:
  cell identity of the cell of a cellular network, in which the tracking unit is residing;
  location approximation based on Observed Time Difference (OTD) from a plurality of base stations of a cellular network;
  satellite positioning accuracy;
  proximity location approximation based on Bluetooth LE-signal.

Thus, the tracking unit may send location updates, which may comprise position data on one or more levels of accuracy. Typically, in almost every occasion a connection to a cellular network can be established. Consequently, at least the cell identity of the cell of a cellular network, in which the tracking unit is residing, can be resolved by the tracking unit. In many occasions, a more precise location within said cell can be approximated on the basis of triangular measurements using Observed Time Difference (OTD) from a plurality of base stations of the cellular network. At least in outdoor environment, a very precise satellite positioning accuracy can be achieved in most occasions.

For indoor and proximity location, the tracking unit may, together with the host apparatus, utilize Bluetooth Low Energy (LE) (a.k.a. Bluetooth Smart) signals. Bluetooth LE enables to estimate the distance between two Bluetooth LE devices based on the Bluetooth radio receiver's RSSI signal value. Thus, when the host apparatus approaches the location of the tracking unit, the approximated distance between host apparatus and the tracking unit may be provided to the host apparatus. Other Bluetooth LE capable devices with the range of the Bluetooth signal may operate as beacons, thereby enabling obtain further point of reference for approximating the location.

The tracking unit may further comprise a magnetometer, which may be utilized in obtaining a location approximation, especially in indoor environment. Herein, local variations in the Earth's magnetic field may be used to obtain enhanced location approximation. It is known that buildings may have individual variations of magnetic field, which are due to e.g. Earth's local magnetic field and the structures of the building. Thus, the individual magnetic field profile may be registered to a building, which information is utilized e.g. in IndoorAtlas™ location service.

The tracking unit may sense these magnetic variations by its magnetometer, and if registered building information corresponding to the sensed magnetic field is found, the tracking unit may determine its location at least at an accuracy level of a building.

A second aspect relates to the operation of the positioning application managing the tracking services between the tracking unit-host apparatus-pairs. The positioning application residing in the network may be implemented as a computer program product, stored on a computer readable medium and executable in a data processing device, for processing tracking data.

Such a computer program product comprises a computer program code for registering a pairing of a tracking unit and a host apparatus; a computer program code for maintaining a location update request of the tracking unit received from said host apparatus; a computer program code for providing, in response to a checking request from said tracking unit, said location update request to said tracking unit; and a computer program code for providing, in response to receiving position data of tracking unit, the position data of tracking unit to said host apparatus.

Hence, as described above, the positioning application handles the registrations of the pairings between the tracking units and host apparatuses and maintains the location update requests made by the host apparatuses. When the tracking unit switches to the active state and makes a request for checking if a location update request has been made, the positioning application sends the location update request to the tracking unit. When the tracking unit submits its position data, the positioning application forwards the position data to the host apparatus. Even if there were no location update request, the tracking unit may submit its status update, possibly together with said request, whether the tracking unit is in the active/first power saving state, the second power saving state or the alarm state. The positioning application updates the status information of the tracking unit accordingly.

According to an embodiment, in response to receiving a location update request of the tracking unit from a particular host apparatus, the positioning application checks, before allowing access to the position data of said tracking unit, that a pairing of said tracking unit and said particular host apparatus has been registered. Thereby, it is ensured that no unauthorized access to the position data of the tracking unit is allowed.

A third aspect relates to the operation and functionalities of the host apparatus. As described above, as a part of the first pairing process the host apparatus may download a host application, via which the tracking services may be used. Naturally, the same host application may then be used if further tracking units are paired with the same host apparatus.

After carrying out the pairing with at least one tracking unit as described above, the user interface of the host application provides the user with means for monitoring the status of the at least one tracking unit, means for sending location update requests to the tracking unit, and means for sending commands for adjusting the settings of the tracking unit.

The user interface may provide a list of the tracking units to be monitored, and the status of each tracking unit. The status may be, for example, one of the following:
 active/first power saving state; i.e. a normal operation mode
 second power saving state; i.e. a sleep mode
 power-off state; i.e. switched off
 alarm state; i.e. sending location updates constantly If there is a plurality of tracking units to be monitored, the user interface preferably provides a dedicated view to each of the tracking units. The tracking unit view may provide, for example, further information about the wearer of the tracking unit (name/ID), how long the tracking unit has been in its current state and the position data of the latest location update. The tracking unit view may comprise a map view where the position data of the latest location update is shown.

The tracking unit view may comprise means, e.g. a button, for sending location update requests to the tracking unit. The location update request is sent to the positioning application, which maintains the request until the next the checking carried out by the tracking unit.

The tracking unit view may comprise means, e.g. buttons or pull-down menus, for sending commands for adjusting the settings of the tracking unit. The commands may include, for example, one of the following:
 switch the tracking unit to/from the power-off state
 switch the tracking unit to/from the alarm state
 share the control of the tracking with a second host apparatus.

Similarly to the location update request, the commands are sent to the positioning application, which maintains the commands until the next the checking carried out by the tracking unit. Alternatively, if the tracking unit is within the range of Bluetooth, the commands can be sent directly to the tracking unit.

It is also possible that in addition to or instead of the host application downloaded to the host apparatus, the host apparatus may carry out the operations via a web-based connection.

A skilled man appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, a server device may comprise circuitry and electronics for handling, receiving and transmitting data, computer program code in a memory, and a processor that, when running the computer program code, causes the server to carry out the features of an embodiment. Yet further, the host apparatus may comprise circuitry and electronics for handling, receiving and transmitting data, computer program code in a memory, and a processor that, when running the computer program code, causes the host apparatus to carry out the features of an embodiment.

It is obvious that the present invention is not limited solely to the above-presented embodiments, but it can be modified within the scope of the appended claims.

The invention claimed is:

1. A tracking unit attached to or carried by an object/subject for tracking a position of the object/subject, the tracking unit comprises:
 a positioning circuitry for determining a location of the tracking unit;
 a transceiver circuitry for communicating at least position data of the tracking unit;
 a power supplying circuitry for supplying power to the tracking unit;
 an acceleration sensor for monitoring immobility of the tracking unit; and
 the tracking unit being configured to be paired with a host apparatus, the host apparatus being entitled, in response to said pairing, to send location update requests of the tracking unit to a network address of a positioning application;
 switch from a first power saving state to an active state after a first predetermined period;

send autonomously after said first predetermined period a request to a network address of a positioning application for checking if a location update request has been given by the host apparatus to the tracking unit; in response to the location update request being given, determine the location of the tracking unit and send the position data of the tracking unit to the network address at repeated intervals for a second predetermined time period;

in response to the location update request not being given or the expiration of the second predetermined time period, switch back to the first power saving state;

monitor output signals of said acceleration sensor; and in response to said output signals of said acceleration sensor indicating that the tracking unit has been substantially stationary for a predetermined immobility period, switching the tracking unit to a second power saving state from the first power saving state, wherein the predetermined immobility period is substantially longer than the first predetermined time period and wherein the tracking unit is configured to consume less power in the second power saving state than in the first power saving state.

2. The tracking unit according to claim 1, wherein said pairing comprises;

waking up the tracking unit from a power-off state;

carrying out a wireless pairing between the tracking unit and the host apparatus; and registering the tracking unit with said positioning application, said registering including transmitting a unique identification of the tracking unit to said positioning application.

3. The tracking unit according to claim 2, further comprising a near-field-communication (NFC) tag, and wherein said tracking unit is further configured to wake up the tracking unit from the power-off state by activating the tag.

4. The tracking unit according to claim 2, wherein said tracking unit is configured to be paired with the host apparatus by NFC pairing or Bluetooth pairing.

5. The tracking unit according to claim 1, further comprising a battery and wherein the tracking unit is further configured to;

monitor a charging level of the battery; and in response to the charging level dropping below a predetermined threshold value, to send an indication to the positioning application and/or to the host apparatus.

6. The tracking unit according to claim 1, wherein the tracking unit is further configured to adjust any of the first predetermined timed period, the second predetermined time period and the repeated intervals of sending alarm signal according commands received from the host apparatus.

7. The tracking unit according to claim 1, wherein the tracking unit is further configured to determine the position data of the tracking unit on a plurality of levels of accuracy, said levels of accuracy including one or more of the following:

cell identity of a cell or a cellular network in which the tracking unit resides;

location approximation based on Observed Time Difference (OTD) from a plurality of based stations of a cellular network;

satellite positioning accuracy;

proximity location approximation based on Bluetooth LE-signal.

8. A portable computing device comprising a tracking unit for tracking a position of the portable computing device, the tracking unit comprises:

a positioning circuitry for determining a location of the tracking unit;

a transceiver circuitry for communicating at least position data of the tracking unit;

a power supplying circuitry for supplying power to the tracking unit;

an acceleration sensor for monitoring immobility of the tracking unit; and the tracking unit being configured to be paired with a host apparatus, the host apparatus being entitled, in response to said pairing, to send location update requests of the tracking unit to a network address of a positioning application;

switch from a first power saving state to an active state after a first predetermined period;

send autonomously after said first predetermined period a request to a network address of a positioning application for checking if a location update request has been given by the host apparatus to the tracking unit;

in response to the location update request being given, determine the location of the tracking unit and send the position data of the tracking unit to the network address at repeated intervals for a second predetermined time period;

in response to the location update request not being given or the expiration of the second predetermined time period, switch back to the first power saving state;

monitor output signals of said acceleration sensor; and in response to said output signals of said acceleration sensor indicating that the tracking unit has been substantially stationary for a predetermined immobility period, switching the tracking unit to a second power saving state from the first power saving state, wherein the predetermined immobility period is substantially longer than the first predetermined time period and wherein the tracking unit is configured to consume less power in the second power saving state than in the first power saving state.

* * * * *